(12) United States Patent
Maier et al.

(10) Patent No.: US 7,765,637 B2
(45) Date of Patent: Aug. 3, 2010

(54) MANUALLY GUIDED SUCTION APPARATUS

(75) Inventors: Georg Maier, Kernen (DE); Markus Zwimpfer, Fellbach-Schmiden (DE); Uwe Gaese, Stuttgart (DE)

(73) Assignee: Andreas Stihl AG & Co. KG (DE)

( * ) Notice: Subject to any disclaimer, the term of this patent is extended or adjusted under 35 U.S.C. 154(b) by 937 days.

(21) Appl. No.: 11/598,185

(22) Filed: Nov. 9, 2006

(65) Prior Publication Data

US 2007/0101535 A1    May 10, 2007

(30) Foreign Application Priority Data

Nov. 10, 2005    (DE) .................. 10 2005 053 620

(51) Int. Cl.
*A47L 5/14* (2006.01)
(52) U.S. Cl. .................... 15/346; 15/327.5; 15/330; 15/353
(58) Field of Classification Search .......... 15/346, 15/347, 327.5, 330, 352, 353, DIG. 8
See application file for complete search history.

(56) References Cited

U.S. PATENT DOCUMENTS

| | | | | |
|---|---|---|---|---|
| 4,559,665 A * | 12/1985 | Fitzwater | ...................... | 15/339 |
| 4,569,100 A * | 2/1986 | Purkapile | ................... | 15/327.2 |
| 6,081,961 A * | 7/2000 | Wang | ........................ | 15/327.2 |
| 6,379,439 B1 * | 4/2002 | Shimizu | ...................... | 96/333 |
| 6,391,095 B1 * | 5/2002 | Conrad et al. | ................. | 95/271 |

* cited by examiner

*Primary Examiner*—Dung Van Nguyen
(74) *Attorney, Agent, or Firm*—Robert W. Becker; Robert W. Becker & Assoc (57) ABSTRACT

A manually guided suction apparatus for suctioning up material via a suction air stream, comprising a suction fan having a fan housing surrounding a fan wheel and provided with an intake opening. A removal opening for sucked up material is disposed upstream of the intake opening in an intake channel that guides the suction air stream toward the suction fan. The removal opening empties into a collection bag, and the suction air stream in the intake channel is guided past the removal opening. An endless tube folded up to form a supply portion is stored in a storage chamber. A container portion of the endless tube forms the collection bag. A weight support for the collection bag prevents the supply portion from being pulled out of the storage chamber.

19 Claims, 8 Drawing Sheets

MANUALLY GUIDED SUCTION APPARATUS

The instant application should be granted the priority date of Nov. 10, 2005 the filing date of the corresponding German patent application 10 2005 053 620.4.

BACKGROUND OF THE INVENTION

The present invention relates to a manually guided suction apparatus for suctioning up material via a suction air stream.

Manually guided suction apparatus are used in particular as devices in parks and gardens that can be carried on the back for suctioning up material in the form of dirt, refuse, leaves, or the like. Another application is the collection of small fruits, such as nuts, olives or the like.

A suction fan that is driven by a drive motor draws in an air stream and blows it back out as a discharge air stream. In a known construction, a venturi device is disposed in the discharge air stream for producing an underpressure therein, thereby generating a suction air stream for sucking up the material. The material that is sucked up is conveyed into a collection bag by means of the discharge air stream.

Pursuant to another known construction, the air stream drawn in by the suction fan is used as a suction air stream for sucking up material. Particles carried along by the suction air stream are conveyed through the interior of the suction fan and are conveyed to a collection bag with the exiting discharge air stream. The particles can lead to wear of the fan wheel and of the fan housing.

The discharge air stream that is conveyed into the collection bag inflates the bag and must again be conveyed out of the bag. To be able to remove or draw the discharge air stream out, the collection bag must be formed of a permeable material. Expensive or complicated measures can be required for a shape-imparting support of the collection bag. The permeable material of the bag is problematic, in particular in conjunction with moist material that is sucked up and that can stick to the collection bag and clog the pores thereof. For example, when sucking up dog feces or other dirt, the hygienic conditions for the operator require improvement. Replacing and closing-off the filled collection bag is complicated.

It is therefore an object of the present invention to improve a manually guided suction apparatus of the aforementioned general type in such a way that collection of the sucked-up material is improved.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The manually guided suction apparatus of the present application for suctioning up material via a suction air stream comprises a suction fan that is driven by a drive motor and includes a fan wheel and a fan housing that surrounds the fan wheel; the fan housing has an intake opening, and a removal opening for material that is sucked up is disposed upstream of the intake opening in an intake channel that guides the suction air stream toward the suction fan; the removal opening empties into a collection bag that can be closed off in an essentially flow-tight manner; the suction air stream in the intake channel is guided past the removal opening; an endless tube is folded up to form a supply portion that is stored in a storage chamber of the suction apparatus, wherein proceeding from the storage chamber a container portion of the endless tube forms the collection bag; a weight support for the collection bag prevents the supply portion from being pulled out of the storage chamber.

It has been shown that with an appropriate configuration of the removal opening in the intake channel, a removal of the sucked-up material from the suction air stream can be effected without having to guide the suction air stream itself into the collection bag or through it. By utilizing the force of gravity and/or the centrifugal force where a curved path is provided for the suction air stream, a separation can essentially be produced using only the inertial forces that occur. The lack of a noticeable air stream in the collection bag makes it possible to close off the bag in an essentially flow-tight manner without having to provide a complicated shaped support for the expansion of the collection bag. Depending upon the configuration of the suction apparatus, an inner pressure can be obtained in the collection bag that, although it deviates from the atmospheric pressure, does not produce a significant pressure differential. By using simple shape-imparting means, or merely by means of the sucked-up material that enters, the collection bag maintains is volumetric shape with a large receiving capacity.

Providing an endless tube for forming the collection bag improves operator comfort. When the collection bag is sealed, the container portion that forms the collection bag can be removed from the endless tube and can be closed off. The supply portion of the endless tube that is made available in the storage chamber is then withdrawn, whereby after being closed off at the bottom it forms the new collection bag. In particular, the possibility is provided that after filling the collection bag the endless tube can be bound off or clamped shut above the filled quantity, and can subsequently then be removed. The operator does not come into contact with the filled material, thereby avoiding hygiene problems.

The weight support of the collection bag prevents an automatic pulling of the supply portion out of the storage chamber under the effect of the weight of the filled material. The collection bag can be disposed in a freely suspended manner on a suitable holder, as a result of which an overall straightforward structural design is provided. Shape imparting and supporting containers, which adversely affect the ability to handle the suction apparatus and limit the filling capacity, are not required. Rather, the receiving volume of the collection bag can be arbitrarily set by the user by withdrawing a freely selectable length of the endless tube and closing it off to form a collection bag. With lightweight material that is to be sucked up, such as, for example, leaves, the bag can be correspondingly large, whereas with heavy material the collection volume can be set correspondingly small by the operator.

The storage of the endless tube in the storage chamber permits operation that is nearly free of interruption. A complicated and cumbersome emptying of the collection bag is not required. Rather, a sufficient length of hose is kept available in the storage chamber that suffices to form a plurality of collection bags. After the collection bag is filled it can be removed and placed to the side without the necessity for a cumbersome emptying and/or insertion of an empty collection bag.

Pursuant to a preferred further development, to form the weight support the endless tube is held in the region between its supply portion and its container portion, especially in a clamping manner. During operation, the container portion is monolithically connected to the supply portion. Leaks in this region are avoided. Clamping of the endless tube is straightforward and is effective with regard to absorbing forces. While maintaining the tube shape, the collection bag is also spread apart in this region, thereby providing a suitable receiving volume without the need for further supporting measures.

In the region of the annular storage chamber, the clamped portion of the endless tube expediently rests upon an in particular annular abutment surface, whereby the clamping band or strap is guided about the clamped portion to form the weight support and presses the clamped portion against the abutment surface. The arrangement has a straightforward construction. From an operator standpoint, the strap is easy to actuate and if damaged can also be replaced. Alternatively, or in addition thereto, it can also be expedient to provide a clamping member to form the weight support that presses the folded-up supply portion of the endless tube against the abutment surface. In addition to an effective weight support, the supply portion of the endless tube is also reliably held in the storage chamber and is protected from sliding out. The clamping effect of the clamping member presses the supply portion of the endless tube together and reduces its volume. Within a prescribed supply volume, a relatively large amount of endless tube can be stored. In both cases, the weight support also performs a sealing function.

Pursuant to an advantageous further development, a support bracket that acts upon the collection bag is disposed below the bag, as viewed in a gravitational direction. The support bracket can carry out multiple functions. The collection bag can be seated upon it, as a result of which the support bracket acts as a weight support. In conjunction with a detachable clamp on the support bracket, it can also be provided for closing off the collection bag. The combination of support bracket and clamp is expedient at various points in time during use. To begin with, the clamp can be provided for closing off the lower end of the endless tube to form the collection bag. After the bag has been filled, the lower end can be knotted off, fused, or closed off with a filament clamp or tie. By withdrawing the endless tube out of the storage chamber, the filled bag is lowered whereby its upper side can initially be temporarily closed off with the clamp of the support bracket. This simplifies a subsequent knotting, fusion or clamping-off of the upper bag opening, while at the same time the new collection bag is already formed in a finished manner.

A shape-imparting support structure is preferably provided for the collection bag and is disposed in particular on the inside of the collection bag. The receiving volume of the collection bag that is prescribed by the quantity of tube that is withdrawn can be utilized to the maximum extent. The sucked-in or filled material that enters as a result of its weight need not actively expand the collection bag; rather, the material can, in an unobstructed manner, enter into the interior of the collection bag that has been previously expanded by the shape-imparting support structure.

In an expedient embodiment, the storage chamber for the endless tube is disposed on a holder that in the region of the removal opening extends around in an annular manner and, via an opening that empties into the collection bag, is connected to the removal opening. An annular component is formed that surrounds the removal opening. In addition to the active operation, the construction is compact. Only a small storage space is required for the suction apparatus. In preparation for operation, the endless tube is withdrawn out of the annular holder and is formed into a collection bag, whereby the annular holder supports the cross-section of the collection bag and at the same time also provides a sealing function against the edges of the removal opening. A reliable introduction of the material that is sucked up that is free of leakage is ensured, as is a retention of the material in the collection bag.

It can also be expedient, in addition to the endless hose, to provide an essentially rigid collection container into which the removal opening empties. The collection container is not sensitive to sharp-edged material that is sucked up, such as metal cans or the like. Not sensitive to fluctuations in pressure or the like, the collection container maintains it receiving volume, even under varying atmospheric or suction conditions. For this purpose, it can be expedient to withdraw the endless tube out of the storage chamber only after the collection container has been filled, and to then form the tube into a collection bag. The sucked-up material that is collected in the collection container is then filled into the collection bag and placed to the side. It is in particular advantageous if an underside of the storage chamber that is disposed opposite the removal opening extends in an annular manner about the collection container, whereby the closed container portion of the endless tube forms a bottom of the collection container. The filled material of the endless tube here also has a sealing function. The arrangement and actuation of a cover-like closure bottom or the like of the collection container is not necessary. Rather, after the collection container is filled, the collection bag that is closed off at the bottom is dropped down by a certain amount, whereby the contents of the collection container are emptied into the collection bag that is thereby formed. After the filled collection bag is clamped off and removed, the same operation also forms a collection container having a film bottom that is again ready for use.

The endless tube is preferably made of an airtight film of polymeric material that is in particular liquid tight and/or odor proof. Independent sealing measures, for example in the form of a housing, are not necessary. A clean path of flow in the intake channel. past the removal opening is ensured while avoiding leakage streams. The user is less affected by dirt, moisture and odor.

The storage chamber and the endless tube are advantageously embodied as an assembly unit that is detachable from the rest of the suction apparatus. When operating over larger surface areas, for example in parks or the like, assembly units that have each been filled with an endless tube can be carried along. As soon as the endless tube that has been stored in one assembly unit is used up, it can be replaced by the next assembly unit with few manipulations. The refilling of the storage chamber with the tube material can be effected off site, for example in a factory, under more favorable conditions. It is also possible to provide the assembly unit for only a single use, so that after the endless tube is used up it can be disposed of.

To remove heavy sucked-up material such as metal cans or the like, it can be expedient to dispose a removal opening in a linear section on the bottom of the intake channel. The relatively heavy material essentially falls on its own, due to the force of gravity, out of the intake channel through the removal opening and into the collection bag. Pursuant to an advantageous further development, disposed upstream of the intake opening of the suction fan is a centrifugal separator for producing a curved path of the suction air stream, whereby the peripheral wall of the centrifugal separator has a removal opening for the material that is to be sucked up, and whereby the intake opening of the suction fan is disposed approximately in a central portion of the centrifugal separator. As a result of the curved path of the suction air stream, even lighter sucked-up material, due to its mass moment of inertia or the centrifugal forces that occur, is urged outwardly toward the curved peripheral wall, where it slides along. As this lighter material slides along the peripheral wall, it meets the removal opening that is disposed in the curved peripheral wall and exits outwardly through this opening into the collection bag. After passing the removal opening, the suction air stream has only a lowparticle concentration. Residual particles that remain are also concentrated toward the outside due to the centrifugal force, while the center of the centrifugal separator has an only relatively low particle concentration. The intake opening of the suction fan is disposed in the central portion through which the suction air stream now enters with a significantly lower particle loading. The fan wheel and the fan housing are thus subjected to only slight abrasion, while at the same time a high suction and removal capacity are ensured.

To increase the removal efficiency, the removal opening in the customary operating position expediently faces in the gravitational direction. Added to the centrifugal forces acting upon the sucked-up material, in the region of the removal opening, is the force of gravity, which enhances a complete discharge of the sucked-up material out of the removal opening.

Further specific features of the present application will be described in detail subsequently.

DESCRIPTION OF SPECIFIC EMBODIMENTS

Figure 1:
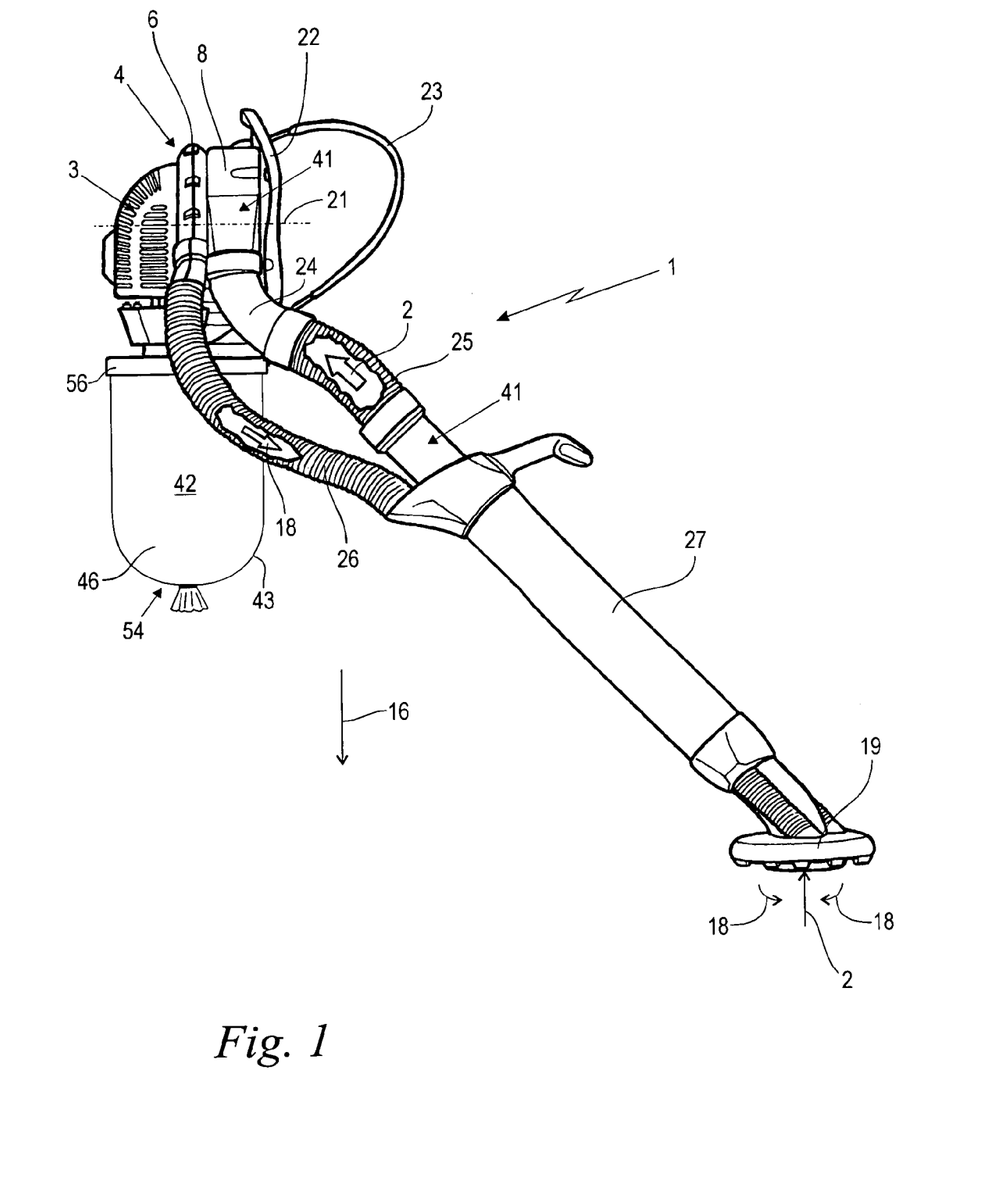
FIG. 1 is a side view of an inventive suction apparatus that can be carried on the back and that has a radial fan, upstream thereof a centrifugal separator, and a collection bag formed from an endless tube.

Referring now to the drawings in detail, FIG. 1 shows a side view of a manually-guided or portable suction apparatus 1 that is designed for being carried on the back of an operator and serves for suctioning up material by means of a suction air stream 2. The suction apparatus 1 includes a drive motor 3, which is not illustrated in detail, is disposed in a housing, and drives a suction fan 4. In the illustrated embodiment, the drive motor is an internal combustion engine, but could also be an electric motor or the like. The suction fan 4 is embodied as a radial fan that is provided with a horizontal axis of rotation 21. An axial fan could also be expedient. Disposed between the suction fan 4 and a backpack 22 having a carrying strap 23 is a centrifugal separator 8, an end face of which is flanged onto that side of a fan housing 6 of the suction fan 4 that is disposed opposite the drive motor 3.

During operation, a suction nozzle 19, which is secured to a free end of a guide tube 27, is held against a surface that is to be cleaned. The suction fan 4 draws in a suction air stream, which is illustrated by the arrows 2; the suction air stream enters the suction nozzle 19 and in so doing carries along the material that is to be suctioned up from the ground. The suction air stream 2 is introduced via the guide tube 27, the suction air hose 25, and an elbow 24 into the centrifugal separator 8, from where it is conveyed into the suction fan 4. The guide tube 27, the suction air hose 25, the elbow 24, and the centrifugal separator 8 form a suction or intake channel 41, which conveys the suction air stream 2 from the suction nozzle 19 to the suction fan 4. On the outlet side, the suction fan 4 generates a discharge air stream, which is indicated by the arrows 18 and can empty into the atmosphere; in the illustrated embodiment, the discharged air stream is conveyed through a discharge air hose 26. Both the suction air hose 25 and the discharge air hose 26 are connected to the. guide tube 27, at the end opposite free end of which is disposed the suction nozzle 19. The discharge air stream 18 that is generated by the suction fan 4 is discharged at the suction nozzle 19, where it whirls the material that is to be sucked up and, mixed with secondary air, again enters the suction nozzle 19 as the suction air stream 2. An essentially closed air stream system results, whereby flow losses are limited to the region of the suction nozzle 19 and the withdrawal of the non-illustrated cooling air stream for the drive motor 3.

The suction apparatus 1 is shown in the normal operating position relative to a downwardly directed gravitational direction, which is indicated by the arrow 16. Relative to the gravitational direction 16, a collection bag 42 is disposed below the centrifugal separator 8, in which the material sucked up by the suction nozzle 19 is separated out of the air stream 2 and is conveyed into the collection bag 42. The material sucked up can be dust, dirt, leaves, material that has been mowed, etc. Small fruits such as nuts, olives or the like can also be sucked up.

Mounted below the centrifugal separator 8 is a holder 56 that supports an endless tube 43 made of an air tight, liquid tight and odor proof film of polymeric material. A container portion 46 of the Do continuous or endless tube 43 is withdrawn downwardly out of the holder 56 in the gravitational direction 16 and is closed off at its lower end 54 in a flow-tight manner. The collection bag 42 is formed by the closed container portion 46 of the endless tube 43; at its upper end, the collection bag 42 is supported on the holder 56 in an annularly widened manner, and rests sealingly against the holder.

In addition to the centrifugal separator 8, in which a coarse separation of the sucked-up material from the suction air stream 2 is effected, a fine separator, for example in the form of a cyclone, could also be provided. Such a fine separator can, for example, be provided between the centrifugal separator 8 and the suction fan 4, and in particular downstream of the suction fan, whereby the dust or other material that is separated out is preferably conveyed into the collection bag 42.

Figure 2:
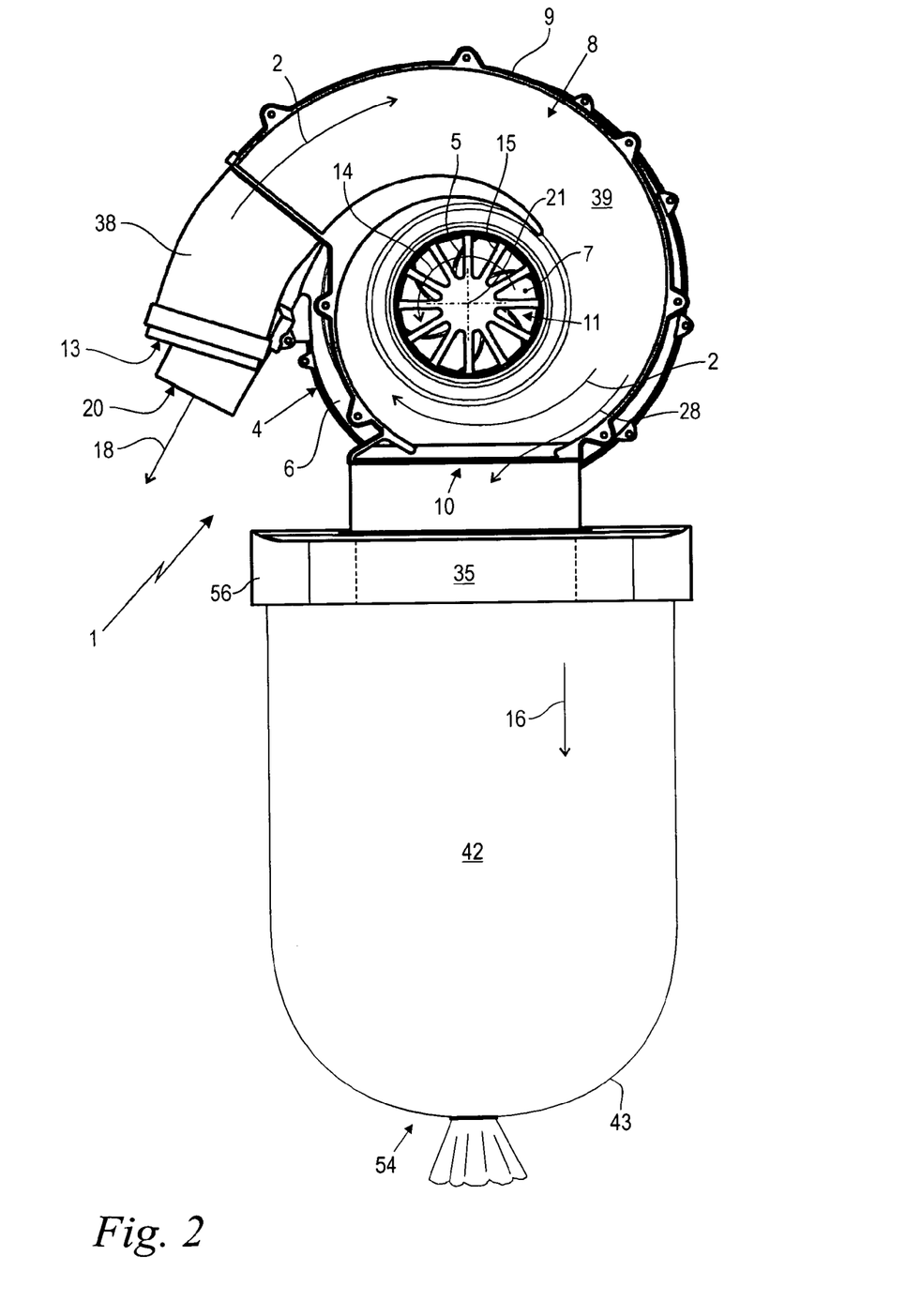
FIG. 2 is an enlarged front view of the suction apparatus of FIG. 1 showing details of the geometrical configuration of the centrifugal separator.

FIG. 2 is a partial plan view of the arrangement of FIG. 1 in the direction of the backpack 22 (FIG. 1), which to facilitate illustration is not shown. The centrifugal separator 8 is shown in an opened view in order to illustrate details of the design of its inner chamber 39.

The centrifugal separator 8 includes an outer peripheral wall 9, which extends about the axis of rotation 21 of the suction fan 4 and narrows, in the direction of the suction air stream, inwardly in a spiral manner with a decreasing radius. A cylindrical configuration of the peripheral wall 9 can also be expedient.

The flow path of the suction air stream 2 in the centrifugal separator 8 begins at an intake opening 13 and, in conformity with the curvature of an upstream intake connector 38 and the peripheral wall 9, extends along a curved path that circulates about the axis of rotation 21, which is disposed perpendicular to the gravitational direction 16 and hence is horizontal. The suction air stream 2 follows the curved path prescribed by the intake connector 38 and the peripheral wall 9, and empties into an intake opening 7 of the suction fan 4; the intake opening 7 is disposed in a central portion 11 of the centrifugal separator 8 and in the illustrated embodiment is disposed centrally relative to the axis of rotation 21. The suction air stream 2 empties centrally into the interior of the fan housing 6 through the intake opening 7. A fan wheel 5, which is driven in the fan housing 6 by the drive motor 3 (FIG. 1), generates a pressure differential that draws in the suction air stream 2 and is blown out as the discharge air stream 18 through a discharge opening 20 of the spiral fan housing 6.

With reference to the gravitational direction 16, the lower portion of the peripheral wall 9 is interrupted, thereby forming a removal opening 10 for the material that is to be sucked up. The removal opening 10 empties into the collection bag 42. For this purpose, the holder 56 directly adjoins the underside of the peripheral wall 9 of the centrifugal separator 8 in a flow-tight manner. The holder 56, with the endless tube 43 that is supported thereon, forms an assembly unit that is detachably secured to the centrifugal separator 8. In the assembled state shown in the drawing, a central opening 35 in the holder 56 directly adjoins the removal opening 10.

Although the curved peripheral wall 9 effects a curved path of the suction air stream 2, the centrifugal forces that act upon the sucked-in material carried along in the curved path lead to a concentration of the material in that region of the suction air stream 2 that directly adjoins the peripheral wall 9. The sucked-in material moves along a radially outwardly disposed path, which is indicated by the arrow 28. In the region of the removal opening 10, added to the centrifugal force, which acts radially relative to the axis of rotation 21, is additionally the force of gravity, which acts in the direction of the arrow 16; consequently, the sucked-in material is conveyed along the arrow 28 through the removal opening 10 and the opening 35 of the holder 56 that directly adjoins it and into the collection bag 42.

During operation the collection bag 42 is essentially flow-tight; consequently, the suction air stream 2 does not flow through the collection bag and in particular does not pass through it into the atmosphere. The separation of the sucked-in material along the arrow 28 and into the collection bag 42 is effected essentially entirely due to the forces of gravity that act on the sucked-in material and essentially without the aid of a carrier air stream being conveyed into the collection container.

The axes of the suction fan 4 and of the centrifugal separator 8 are disposed parallel to one another, whereby an offset of the axes can be expedient. In the illustrated embodiment, the axes are coaxial to the axis of rotation 21 of the fan wheel 5. A direction of rotation of the fan wheel 5 that results during operation is indicated by the arrow 14. Consequently, the direction of flow of the suction air stream 2, which circulates in a spiral manner about the axis of rotation 21, has an opposite direction and is counter to the direction of rotation 14 of the fan wheel 5. The fan housing 6 and the intake connector 38 of the centrifugal separator 8 are oriented relative to one another in such a way that the discharge opening 20 of the suction fan 4, and the inlet opening 13 of the centrifugal separator 8, in the view shown here, which is developed in the direction of the axis of rotation 21, are at least approximately aligned with one another. The drawing-in of the suction air stream 2, and the discharge of the discharge air stream 18, are effected on the same side of the suction apparatus 1 and, relative to the gravitational direction 16, are approximately also at the same height.

From the diagrammatic illustration of FIG. 2, one can additionally see that in the region of the intake opening 7 the fan wheel 5 is covered by a grate 15. This grate can be flat, conical or the like, and in the illustrated embodiment has a hemispherical configuration. In this connection, the spherical segment shape of the grate 15 extends into the interior of the centrifugal separator 8. The grate 15 is provided for direct securement to the fan wheel 5 of the suction fan 4 so that it rotates therewith, and in the installed state covers the intake opening 7 of the suction fan 4. A residual concentration of particles that remains in the suction air stream impinges against the grate 15 and is flung outwardly. The grate provides a reliable protection against the entry of foreign bodies into the intake opening 7 of the suction fan 4. It can also be expedient to fixedly connect the grate 15 with an end wall of the fan housing 6 that is provided with the intake opening 7.

Figure 3:
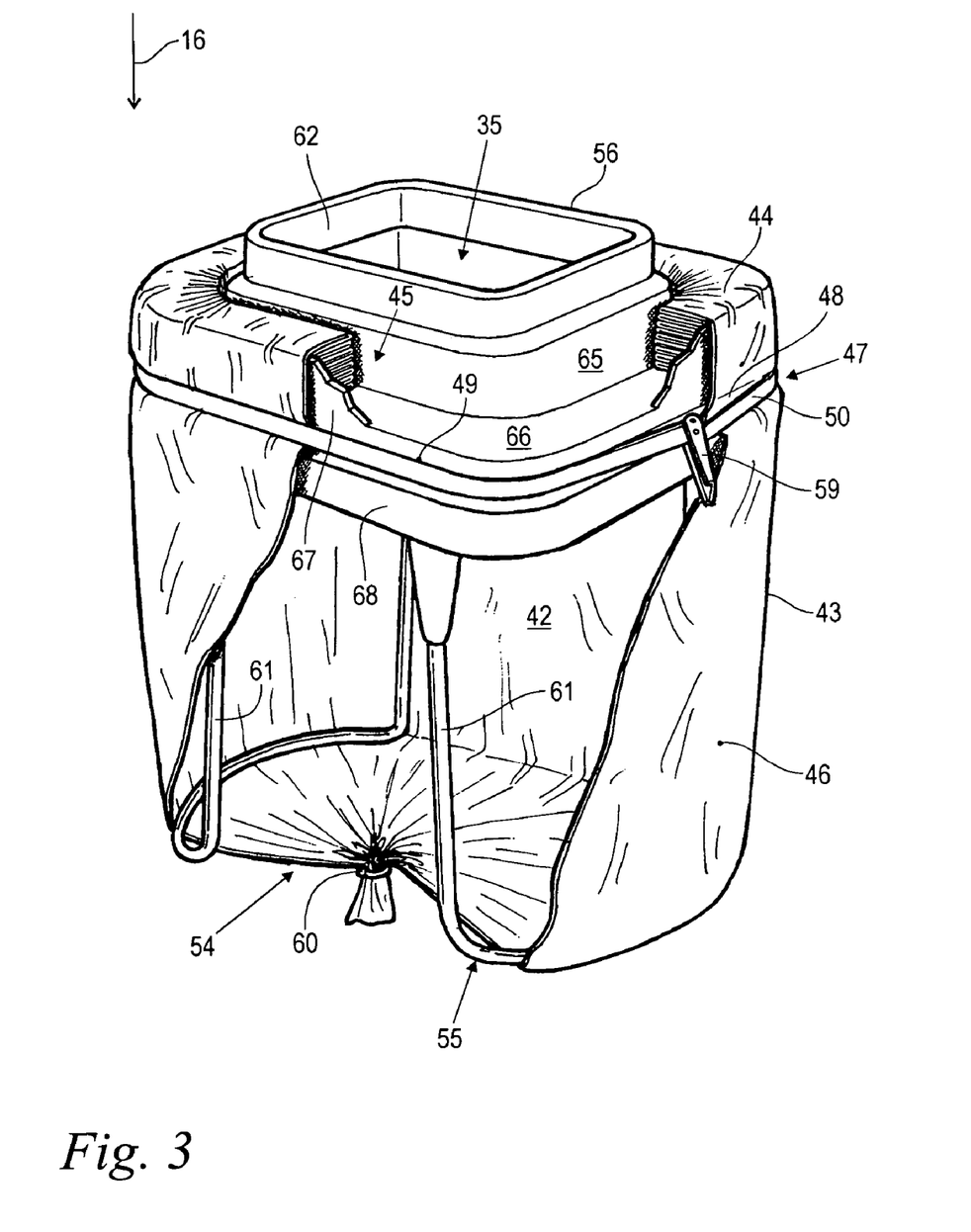
FIG. 3 is a partially sectioned perspective view of an assembly unit that can be detached from the rest of the suction apparatus and that is provided with a holder and an endless tube that is held thereon by a strap and that is supported on the inside in the region of the collection bag by curved pieces.

FIG. 3 shows a perspective view of an assembly unit that in conformity with the illustration of FIGS. 1 and 2 includes the holder 56 and the endless tube 43. The holder 56 is provided with an annular collar 62 that surrounds the opening 35. In conformity with the illustration of FIGS. 1 and 2, the collar 62 of the holder 56 directly adjoins the peripheral wall 9 of the centrifugal separator 8 in a flow-tight manner and in such a way that the removal opening 10 merges directly into the opening 35.

In the gravitational direction 16, adjoining below the collar 62, and having a larger radial spacing, is an inner peripheral wall 65 of an annular storage chamber 45, which has a U-shaped cross-section and is open upwardly. The storage chamber 45 is delimited at the bottom by a base 66, which extends annularly about the inner peripheral wall 65, and is delimited outwardly by an outer peripheral wall 67. A shoulder 68 extends below the storage chamber 45 with an enlarged radial spacing. The aforementioned parts monolithically form the holder 56, which is made of injection molded polymeric material.

The endless tube 43 is monolithically provided with a supply portion 44, a container portion 46, and between them an annularly extending clamped portion 48. The selected designation of the endless tube 43 here means that its originally provided total length is significantly greater than is necessary for producing an individual collection bag 42, and suffices for the formation of a plurality of collection bags. The annularly extending cross-section of the supply portion 44 of the endless tube 43 is folded up in a zig-zagged manner and is stored in the storage chamber 45 of the holder 56. Proceeding from the supply portion 44, the endless tube 43 is first guided upwardly and is then folded downwardly about the upper edge of the outer peripheral wall 67. From there, extending outwardly along the outer side of the outer peripheral wall 67, as well as along the outer side of the shoulder 68, it is guided downwardly.

The outer side of the outer peripheral wall 67, which adjoins the outwardly projecting shoulder 68, forms an annular abutment surface 49 against the outer side of which the clamped portion 48 of the endless tube 43 rests in an annular manner. The clamped portion 48 is surrounded by a clamping band or strap 50 having a clamping lever 59, which in the illustrated arrangement extends outwardly at an angle, as a result of which the strap is loosened. After folding the clamping lever 59 in parallel to the abutment surface 49, the strap 50 is tightened, as a result of which it presses the clamped portion 48 of the endless tube 43 in a radial direction against the abutment surface 49 in a clamped and sealed manner. This prevents the endless tube 43 from sliding through in the gravitational direction 16.

The container portion 46 of the endless tube 43 adjoins the bottom side of the clamped portion 48. The lower end 54 of the container portion 46 is pinched off by means of a filament or similar tie 60, and hence is sealingly closed off. In conjunction with the flow-tight, clamping resting against the abutment surface 49, and the flow-tight transition of the collar 62 at the periphery of the removal opening 10 (FIGS. 1 and 2), an overall flow-tight, closed off collection bag 42 is formed by the container portion 46 of the endless tube 43. The collection bag 42 is suspended essentially freely below the holder 56 and, by means of the tensile stress that results in the material of the container portion 46, supports the weight of the suctioned material that is to fill the collection bag 42. The weight is absorbed by the clamping of the clamped portion 48 against the abutment surface 49, as a result of which a weight support 47 is formed for the collection bag 42, and the suctioned material accommodated therein. The weight support 47 prevents the supply portion 44, which is monolithically connected with the container portion 46, from pulling out of the storage chamber 45 due to the weight.

The upper region of the collection bag 42 is expanded by the peripheral shoulder 68 to such an extent that a correspondingly large receiving volume is provided in the interior of the collection bag 42 regardless of how full it is. The desired collection volume can be obtained, after loosening the strap 50, by pulling the container portion 46 out of the storage chamber 45 to the desired extent, thereby using up some of the supply portion 44; the container portion 46 is then closed off by the filament 60. After the desired length of container portion 46 has been obtained, the clamping lever 59 is tightened, thereby clamping the clamped portion 48 by means of the strap 50.

In addition to the cross-sectional support of the collection bag 42 by means of the peripheral shoulder 68, a shape-imparting support structure 55 is provided that is disposed on the inside of the collection bag 42. In the illustrated embodiment, the support structure 55 includes two curved pieces 61 that are bent in an approximately U-shaped manner and are secured to the underside of the holder 56, from which they extend downwardly in an essentially vertical direction; in the region of the lower end 54 of the collection bag 42, the curved pieces 61 are bent radially outwardly. In the illustrated embodiment, the endless tube 43 is guided about the two curved pieces 61 in a nearly taut manner, whereby the lower end 54 of the collection bag 42 forms an approximately planar bottom. It can also be expedient to withdraw the endless tube 43 further downwardly, whereby the support effect of the support structure 55 is then limited to only the upper portion of the collection bag 42. During operation of the suction apparatus 1 illustrated in FIGS. 1 and 2, a slight underpressure can result in the interior of the collection bag 42. The support structure 55 prevents a pulling together of the collection bag 42 as a result of the underpressure, thereby ensuring an adequately large collection volume of the bag 42.

After the collection bag 42 is filled, the strap 50 is loosened and the filled collection bag is withdrawn downwardly, whereby the supply portion 44 is pulled downwardly below the strap 50. The filled portion of the endless tube 43 is then clamped off above the filled material, is tied or otherwise closed off, and is removed. A hermetically closed off collection bag 42 results that is clamped off at both ends and that contains the collected sucked-up material in a sealed manner. The endless tube 43 that was previously withdrawn from the storage chamber 45 is pulled around the support structure 55 in conformity with the illustration of FIG. 3, and is again closed off with the filament 60 to form an empty collection bag 42. Instead of closing off the bag with the filament 60 that is shown, the lower end 54 of the collection bag 42 can be closed off by a knot, fusing, tying off, or the like. A separation or removal of the filled collection bag 42 can be effected with a sharp knife, with scissors or also thermally using the aforementioned fusing device. The upper side of the filled collection bag 42 is closed off in the same manner.

Figure 4:
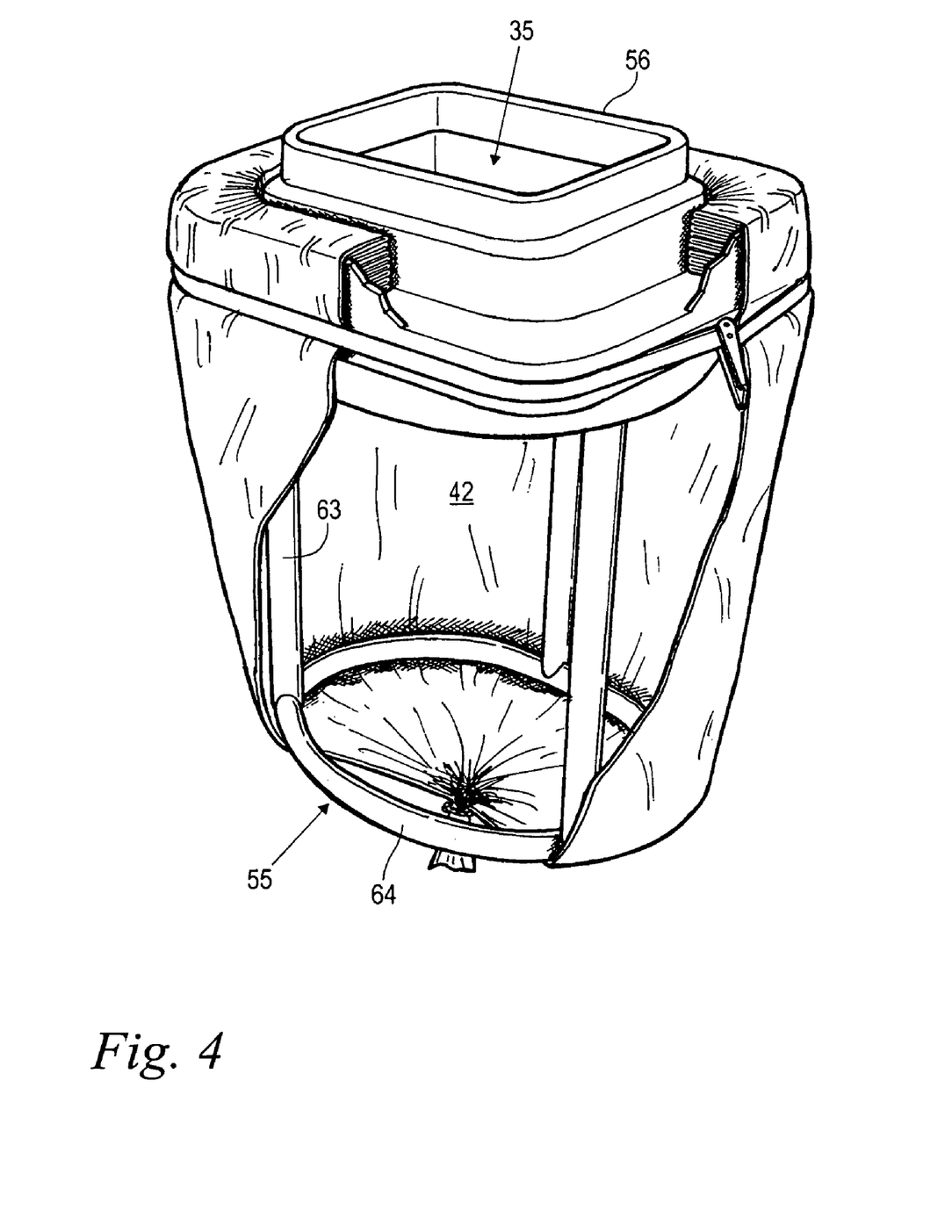
FIG. 4 is a variant of the arrangement of FIG. 3 with a shape-imparting support on the inside via struts and a ring.

FIG. 4 shows a variant of the arrangement of FIG. 3. In this case, the support structure 55 is formed by a total of three struts 63 that extend vertically downwardly from the holder 56 and support a ring 64 at their lower ends. The support structure 55, which is disposed within the collection bag 42 and is composed of the struts 63 and the ring 64, together with the holder 56 holds the collection bag 42, as is also the case with the embodiment of FIG. 3, in a shape such that a spread-apart interior of the collection bag 42 is made available even without sucked-up material disposed therein. The remaining features of the embodiment of FIG. 4 coincide with those of FIG. 3.

Figure 5:
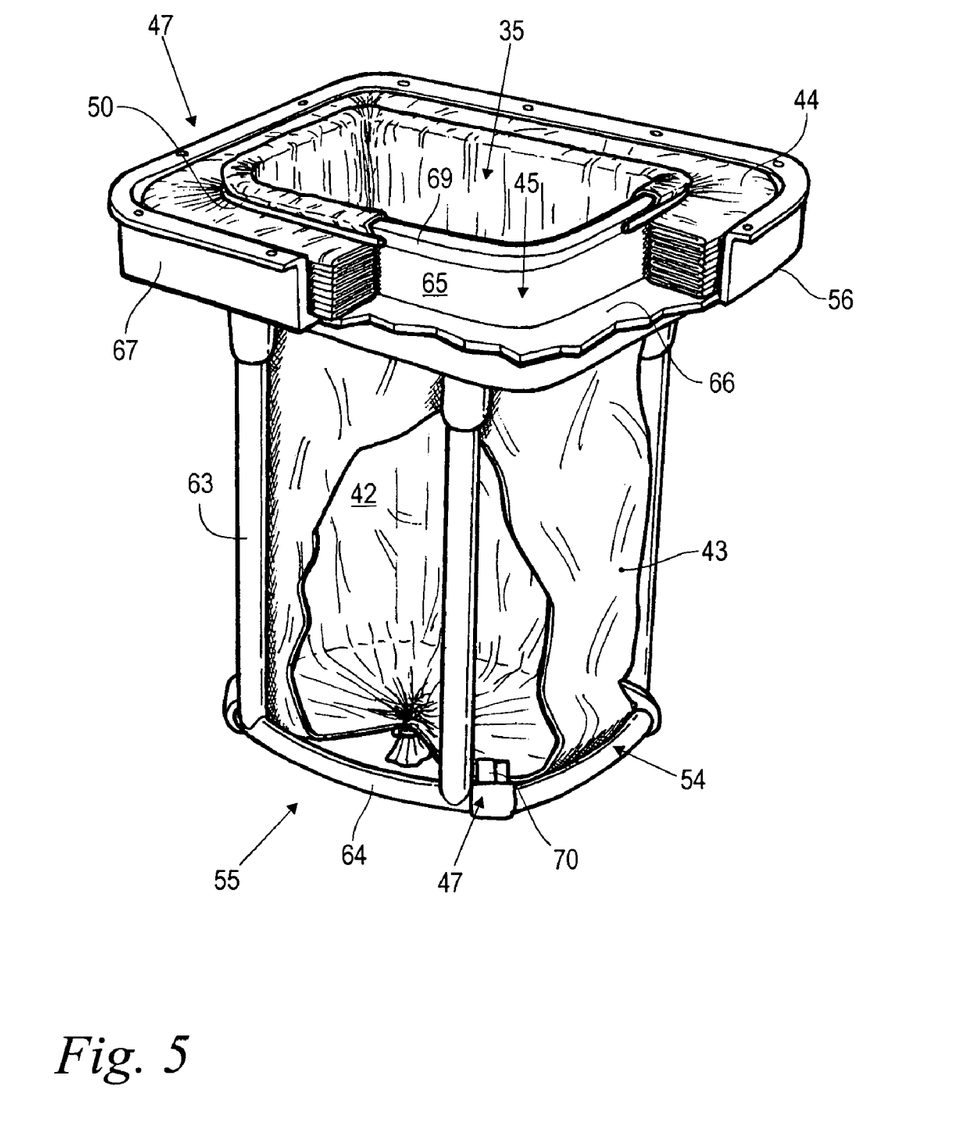
FIG. 5 is an embodiment of the collection bag having a shape-imparting support on the outside via struts and a ring.

FIG. 5 provides a variant of the assembly unit formed of the holder 56 and the endless tube 43. Here, the endless tube 43, proceeding from the supply portion 44, is guided about an inner, upper edge of the inner peripheral wall 65 and is pulled toward the inside and down through the opening 35. The shape-imparting support structure 55, which is composed of a total of four struts 63 and the ring 64, is here disposed on the outer side of the collection bag 42.

A total of two weight supports 47 are provided for the collection bag 42. A first weight support 47 is formed in the region of the inner peripheral wall 65. Formed above the inner peripheral wall 65 is a flange 69 that projects radially outwardly at an angle. The clamping band 50 is here guided around on the outside in the transition region from the inner peripheral wall 65 and the flange 69, and fixedly clamps the endless tube 43 on the outer side of the inner peripheral wall 65.

To form a second weight support 47, and also as part of the support structure 55, provided at the four corner regions of the ring 64, which is rounded in a nearly square or rectangular manner, are a total of four clamps 70 in which the film material of the lower end 54 of the collection bag 42 is clamped. In this connection, the clamps 70 hold the lower end 54 in a radially outward direction, thereby aiding an expansion of a cross-sectional shape of the collection bag 42 in the region of the lower end 54. Furthermore, the clamps 70 are also in the position to absorb a portion of the weight applied by the filled material. The remaining features and reference numerals of the embodiment illustrated here coincide with those of FIGS. 3 and 4.

Figure 6:
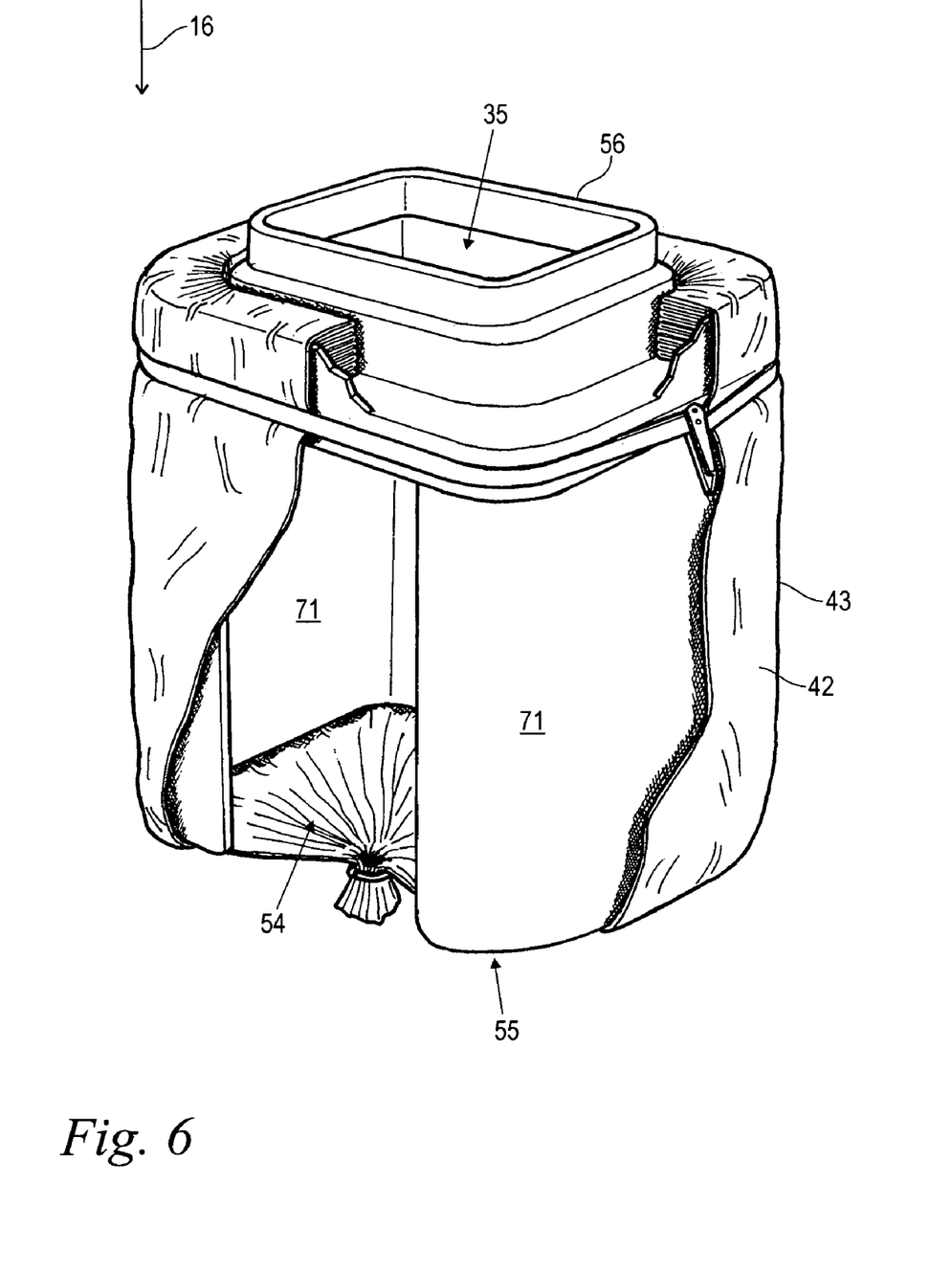
FIG. 6 is a further embodiment of the collection bag having a shape-imparting support on the inside via half shells.

FIG. 6 shows a further embodiment of the assembly unit composed of the holder 56 and the endless tube 43. Here, provided on the underside of the holder 56 are two half shells 71 that extend in the gravitational direction 16 and form the support structure 55 for the collection bag 42. The two half shells 71 are monolithically formed on the holder 56 and are spaced apart in the lateral direction. Furthermore, the half shells 71 are open in a downward direction; therefore, a bottom of the collection bag 42 is formed by the bound-together lower end 54 of the bag. The remaining features of the embodiment of FIG. 6 coincide with those of FIG. 3.

Figure 7:
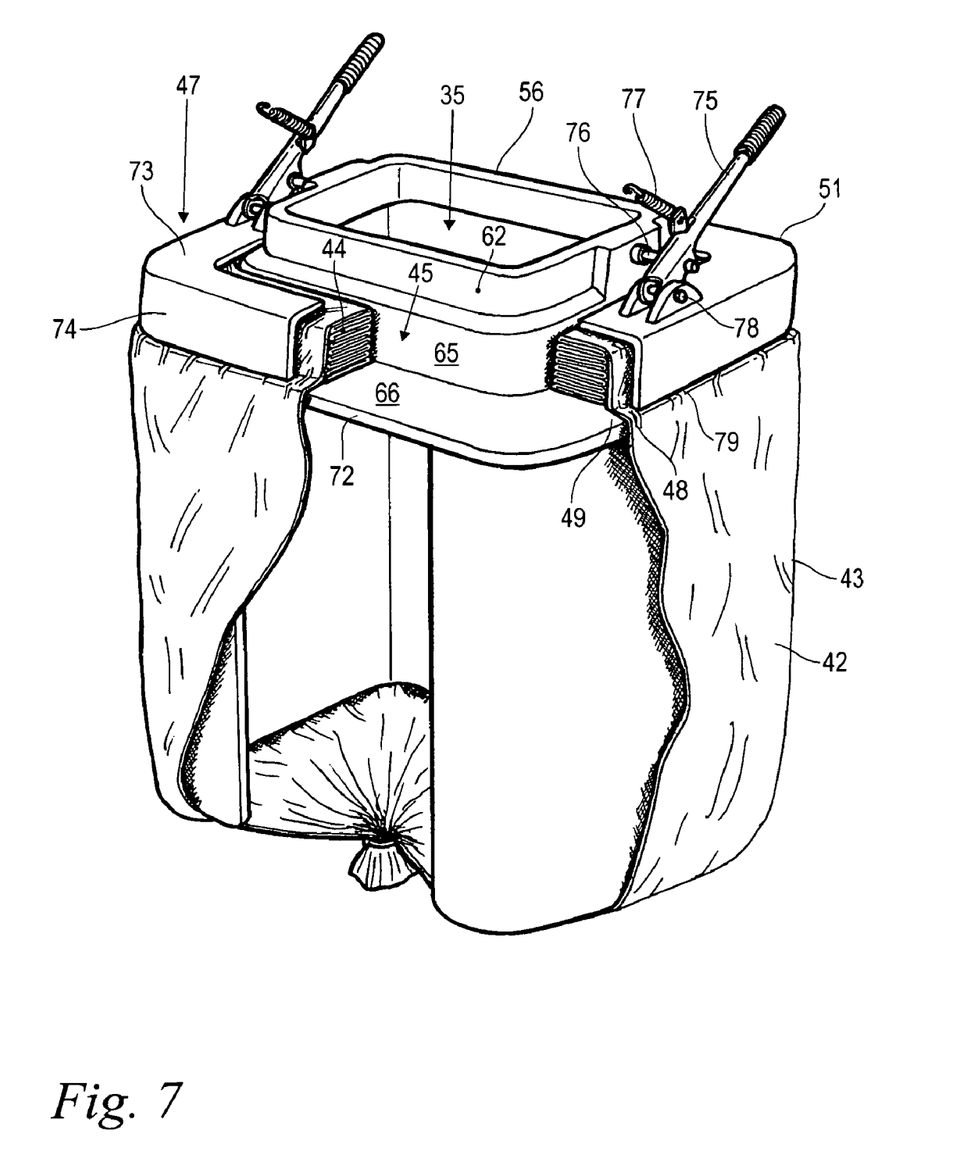
FIG. 7 is a variant of the arrangement of FIG. 6 having a weight support provided by a frame-shaped clamping member.

FIG. 7 shows a variant of the arrangement of FIG. 6. In this case, a weight support 47 is formed by a clamping member 51 that cooperates with the holder 56. The storage chamber 45 of the holder 56 is formed by the inner peripheral wall 65 and the peripheral base 66 that adjoins it at the bottom and on the outer side, whereby the base 66 extends radially outwardly into a free peripheral edge 72. The peripheral cross-section of the clamping member 51 has an approximately L-shaped configuration and comprises an upper, approximately horizontally extending annular surface 73, which is adjoined at the outside and toward the bottom by a peripheral, outer annular wall 74. The clamping member 51 surrounds the pile of the supply portion 44, which is folded in a zig-zagged manner, and holds it together.

A respective lever 75 is disposed on two opposite ends of the collar 62, whereby the two levers 75 are pivotably mounted on the collar 62 about the pivot axes 76. Engaging each lever 75 in the direction of the free end thereof is a tension spring 77 that in the installed state of the assembly unit shown here is secured to a further component of the suction apparatus 1 (FIG. 1). The opposite end of the lever 75, relative to the tension spring 77, is mounted on the upper annular surface 73 of the clamping member 51 by means of a joint 78. The tension force of the spring 77 pivots the lever 75 in such a way that the clamping member 51, at the joint 78, is pressed downwardly against the supply portion 44 and presses the latter together.

In this connection, a lower edge 79 of the clamping member 51 presses the clamped portion 48 of the endless tube 43 against the base 66 that hereby, in performing a double function, also forms an abutment surface 49 for the clamped portion 48. A weight support 47 for the collection bag 42 is thereby formed. The remaining features of the embodiment of FIG. 7 correspond With those of FIG. 6.

Figure 8:
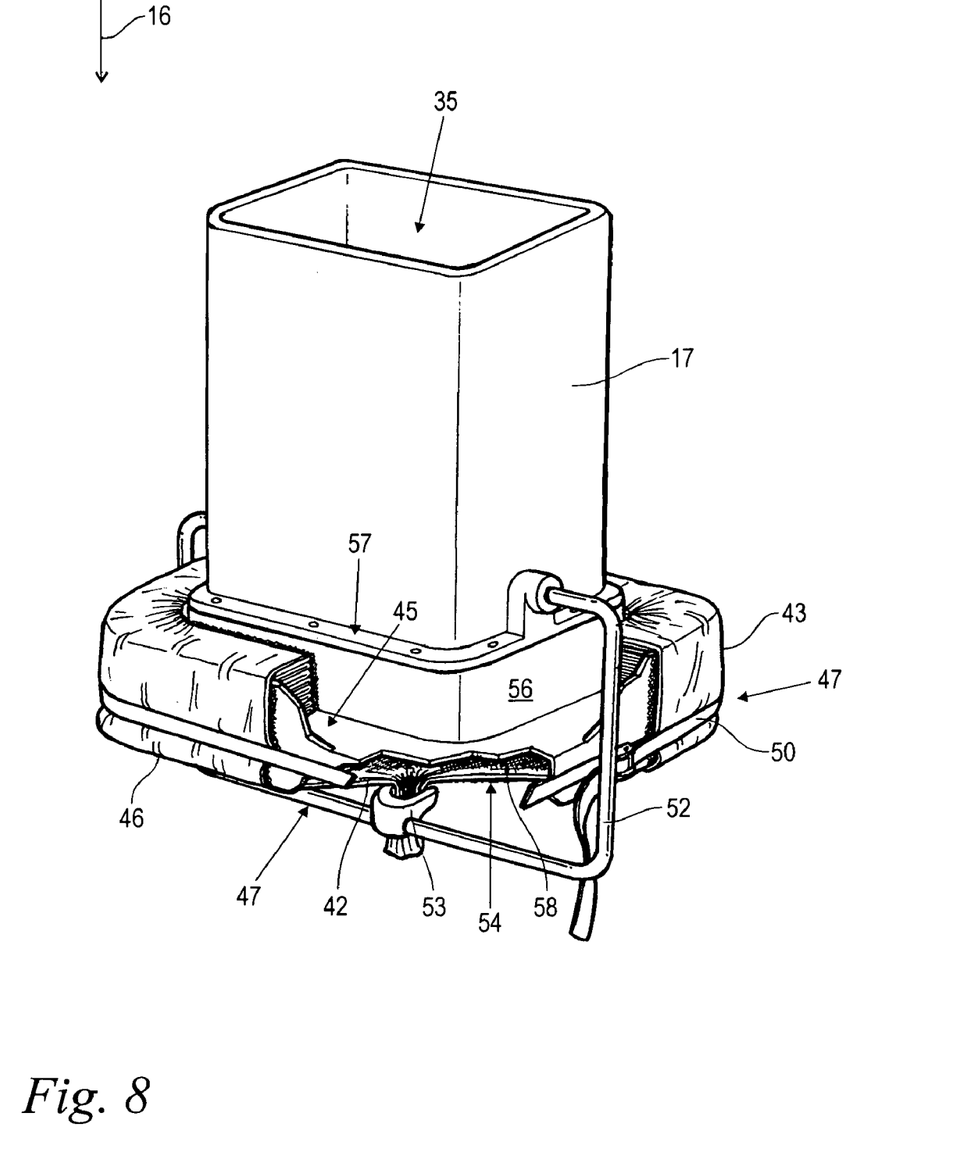
FIG. 8 shows an inherently stable collection container having a collection bag mounted on the bottom and formed from an endless tube.

FIG. 8 shows an embodiment of the exchangeable assembly unit that in addition to the holder 56 and the endless tube 43 also shows a collection container 17 that is essentially inherently stable. The collection container 17 is open in an upward direction to form the opening 35, while the holder 56 is disposed on the underside of the container. It can be expedient to provide the container 17 with a detachable, inherently stable bottom in order to empty the sucked-up material that has collected therein into the collection bag 42 after the container 17 is filled. In the illustrated embodiment, the collection container 17 has an approximately tubular shape, and is also open toward the bottom. The collection container 17 is sealed off toward the bottom by the closed end 54 of the collection bag 42. In this way, a bottom 58 of the collection container 17 is formed.

In conformity with the illustration of FIG. 3, the holder 56 has an annular storage chamber 45 for the endless tube 43 and, at a lower side 57 that is opposite the opening 35 or the associated removal opening 10 (FIG. 2), extends about the collection container 17 in an annular manner. It can be expedient, in conformity with the illustration of FIG. 3, to withdraw the container portion 46 further downwardly and to thereby form a larger collection bag 42. In the illustrated embodiment, the container portion 46 is guided directly inwardly to form the lower end 54, whereby the collection bag 42 is reduced to the bottom 58.

Disposed below the collection container 17 and the collection bag 42, in the gravitational direction 16, is a support bracket 52 that is pivotably secured to side surfaces of the collection container 17 and extends transversely below the illustrated arrangement. In the middle, the support bracket 52 is provided with a clamp 53 by means of which the lower end 54 of the endless tube 43 is detachably closed off to form the collection bag 42. At the same time, the collection bag 42 rests upon the support bracket 52. In addition to the weight support 47 having the strap 50 in conformity with the illustration of FIG. 3, the support bracket 52 forms an additional weight support 47.

After the collection container 17 is full, the collection bag 42 can be closed off above the clamp 53 in the manner previously described and can be removed from the clamp 53. Subsequently, after loosening of the two weight supports 47, the collection bag 42 can be withdrawn downwardly until the sucked-up material that is located in the collection container 17 is accommodated in the collection bag 42. In this state, the collection bag 42 can first be temporarily closed off by the clamp 53 before a subsequent closing-off of the upper side is effected in conformity with the closing off of the lower end 54. This subsequent closing is expediently undertaken below the clamp 53, as a result of which in a single operation at the same time also the new collection bag 42 is closed off at its lower end 54 by means of the clamp 53 in an operationally ready manner.

The specification incorporates by reference the disclosure of German priority document 10 2005 053 620.4 filed Nov. 10, 2005.

The present invention is, of course, in no way restricted to the specific disclosure of the specification and drawings, but also encompasses any modifications within the scope of the appended claims.

What we claim is:

1. A manually guided suction apparatus for suctioning up material via a suction air stream, comprising:

a suction fan that is driven by a drive motor, wherein said suction fan includes a fan wheel and a fan housing that surrounds said fan wheel, wherein said fan housing is provided with an intake opening, wherein a removal opening for material that is adapted to be sucked up is disposed upstream of said intake opening in an intake channel that is adapted to guide the suction air stream toward said suction fan, wherein said removal opening is adapted to empty into a collection bag that is adapted to be closed off in an essentially flow-tight manner, and wherein the suction air stream in said intake channel is adapted to be guided past said removal opening;

a storage chamber;

an endless tube that is adapted to be folded up to form a supply portion that is adapted to be stored in said storage chamber, wherein proceeding from said storage chamber, a container portion of said endless tube forms the collection bag; and a weight support for the collection bag that is adapted to prevent said supply portion from being pulled out of said storage chamber.

2. A suction apparatus according to claim 1, wherein said weight support comprises mechanism for holding said endless tube in a region between said supply portion and said container portion thereof.

3. A suction apparatus according to claim 2, wherein said mechanism for holding holds said endless tube in a clamping manner.

4. A suction apparatus according to claim 2, wherein said endless tube includes a clamped portion, wherein said storage chamber is an annular storage chamber, wherein in the region of said annular storage chamber said clamped portion rests upon an abutment surface, wherein said weight support comprises a strap that is guided about said clamped portion, and wherein said strap presses said clamped portion against said abutment surface.

5. A suction apparatus according to claim 4, wherein said abutment surface is an annular abutment surface.

6. A suction apparatus according to claim 2, wherein said weight support comprises a clamping member that presses said folded up supply portion of said endless tube against an abutment surface.

7. A suction apparatus according to claim 1, further comprising a support bracket that acts upon the collection bag is disposed below the collection bag as viewed in a gravitational direction.

8. A suction apparatus according to claim 7, wherein said support bracket forms said weight support, and wherein the collection bag is seated on said support bracket.

9. A suction apparatus according to claim 7, wherein said support bracket is provided with a detachable clamp for closing off a lower end of said endless tube for forming the collection bag.

10. A suction apparatus according to claim 1, further comprising a shape-imparting support structure is provided for the collection bag.

11. A suction apparatus according to claim 10, wherein said support structure is disposed on an inner side of the collection bag.

12. A suction apparatus according to claim 1, further comprising a holder is provided, wherein said storage chamber is disposed on said holder, wherein said holder extends around in an annular manner in the region of said removal opening, and wherein said holder has an opening that is adapted to empty into the collection bag and communicates with said removal opening.

13. A suction apparatus according to claim 1, which furthermore comprises an essentially rigid collection container into which said removal opening empties.

14. A suction apparatus according to claim 13, wherein on a lower side of said collection container that is opposite said removal opening, said storage chamber extends about said collection container in an annular manner, and wherein said container portion of said endless tube in a closed-off state thereof forms a bottom of said collection container.

15. A suction apparatus according to claim 1, wherein said endless tube is formed of an airtight foil of polymeric material.

16. A suction apparatus according to claim 15, wherein said foil of polymeric material is at least one of liquid tight and odor proof.

17. A suction apparatus according to claim 1, wherein said storage chamber and said endless tube form an assembly unit that is detachable from a remainder of the suction apparatus.

18. A suction apparatus according to claim 1, further comprising a centrifugal separator for producing a curved path of the suction air stream is disposed upstream of said intake opening, wherein said centrifugal separator has a curved peripheral wall in which is disposed said removal opening, and wherein said intake opening is disposed approximately in a central portion of said centrifugal separator.

19. A suction apparatus according to claim 1, wherein in a customary operating position of the suction apparatus, said removal opening faces downwardly as viewed in a gravitational direction.

\* \* \* \* \*